(12) United States Patent
Mueller et al.

(10) Patent No.: US 8,905,521 B2
(45) Date of Patent: Dec. 9, 2014

(54) PRINTING METHOD AND APPARATUS

(71) Applicant: Hewlett-Packard Development Company, L.P., Houston, TX (US)

(72) Inventors: Andreas Mueller, Barcelona (ES); Jacint Humet Pous, Santa Perpetua de Mogoda (ES); Jaime Fernandez del Rio, San Diego, CA (US); Utpal Kumar Sarkar, Saint Quirze del Valles (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/754,198

(22) Filed: Jan. 30, 2013

(65) Prior Publication Data
US 2014/0210911 A1    Jul. 31, 2014

(51) Int. Cl.
*B41J 2/04*    (2006.01)
(52) U.S. Cl.
CPC .......................................... *B41J 2/04* (2013.01)
USPC ............................................................ 347/54

(58) Field of Classification Search
CPC ...... B41J 2/0458; B41J 2/04541; B41J 29/38; B41J 2/04543; B41J 29/393; B41J 2/1631; B41J 2/1639; B41J 2/1628; B41J 2/1642; B41J 2/14427
USPC ........................................................ 347/5, 54
See application file for complete search history.

(56) References Cited

U.S. PATENT DOCUMENTS

| | | | | |
|---|---|---|---|---|
| 6,491,374 B1 * | 12/2002 | Bauer et al. | ...................... | 347/43 |
| 7,004,572 B2 * | 2/2006 | Pinard | ............................. | 347/74 |
| 2008/0309952 A9 * | 12/2008 | Billow et al. | .................. | 358/1.8 |

* cited by examiner

*Primary Examiner* — Lisa M Solomon

(57) ABSTRACT

An apparatus and method for use in printing a swath in a multipass printing device are disclosed. The method comprises selectively depositing a drop of ink associated with a pixel to be printed on a print media based on a substantially uniform print mask function during a first pass of a print head, and selectively depositing a further drop of ink associated with the pixel on the print media based on a ramp print mask function during a further pass of the print head.

17 Claims, 3 Drawing Sheets

PRINTING METHOD AND APPARATUS

BACKGROUND

Inkjet printers print dots on a print medium by ejecting small drops of ink from one or more nozzles. Commonly, a number of nozzles are carried on a moveable print head which can be scanned across a surface of the print medium. Each nozzle may be controlled individually to eject a drop of printing fluid, such as ink when commanded. By appropriate control of each nozzle as the print head carrying the nozzles is scanned across the surface of the print media, a desired pattern of printing fluid drops can be deposited on the print medium.

In order to print a color image using a limited number of colors of ink, halftone techniques are used whereby each pixel of the color image is formed from a number of dots of ink of the available colors. For each color of ink deposited a limited number of drops of ink may be deposited for each pixel in a single pass. Typically, this is limited to a single drop of ink of a particular color being deposited at a given pixel in a single pass as the print head is scanned across the print medium.

Thus, while light color pixels may be printed in a single pass of the print head, darker color pixels may require more ink drops to be deposited and, therefore, require multiple passes of the print head.

Print heads may carry an array of nozzles allowing ink to be deposited in a number of lines of pixels, or a swath, in a single pass of the print head. To allow a full image, consisting of a number of swathes to be deposited on the print medium, the medium is advanced through the printer to allow subsequent swathes to be deposited. However, it is common for errors in the advance step to result in undesired artifacts in the final image produced.

Typically, if the print medium is advanced by too small amount, printed swathes may overlap leading to darker or more saturated bands of color, while advancing the print medium by too large a step may result in areas between swathes with insufficient or no ink drops. Such banding is undesirable.

BRIEF INTRODUCTION OF THE DRAWINGS

Embodiments of the present invention are further described hereinafter by way of example only with reference to the accompanying drawings, in which.

DETAILED DESCRIPTION OF AN EXAMPLE

Figure 1:
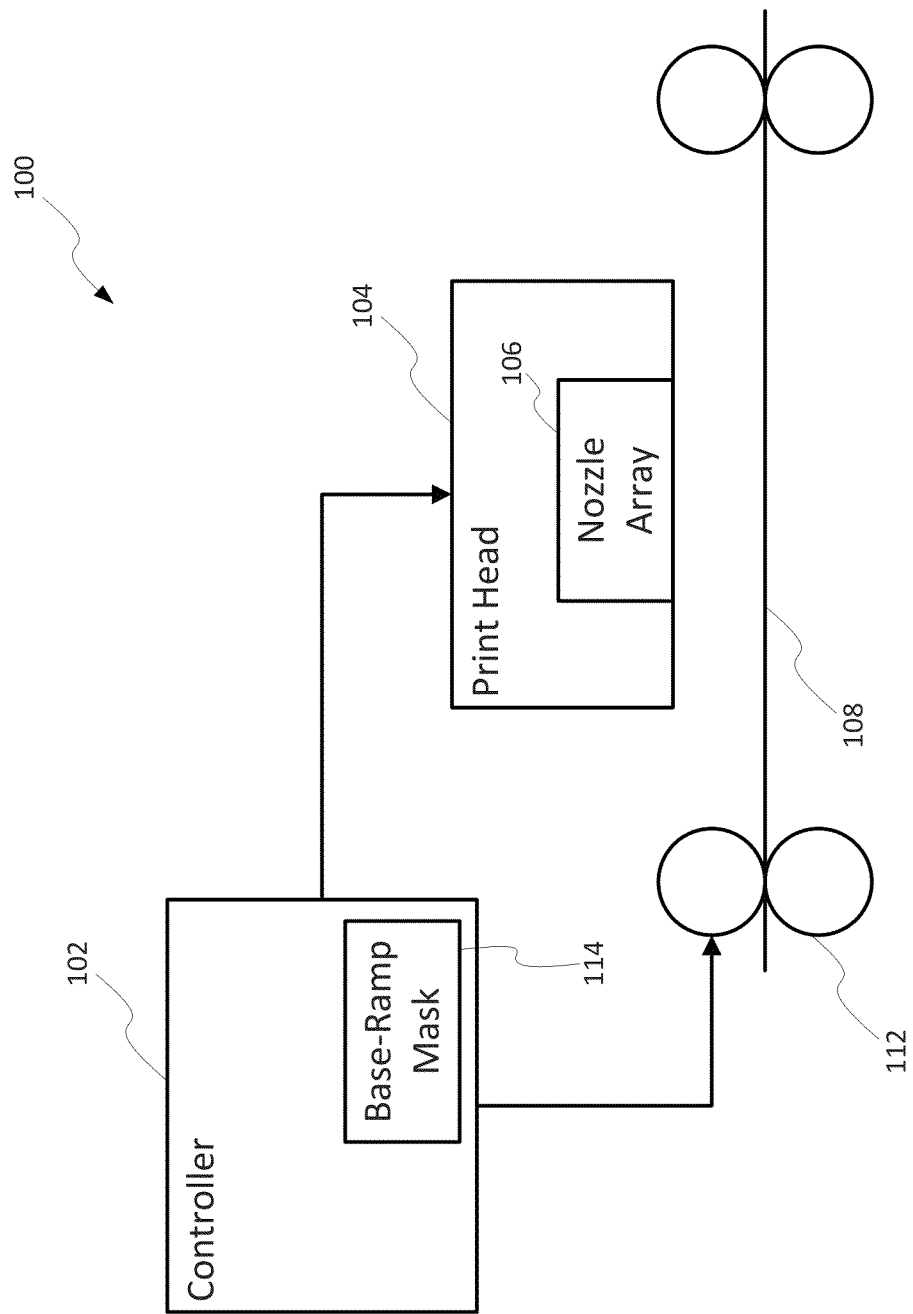
FIG. 1 illustrates the effect of combining different nozzle profiles for different layers according to one example.

To control the placement of ink drops for pixels being printed, print masks are used which define the location at which a dot of a particular color can be deposited in a halftone pattern associated with a specified pixel during a single pass of the print head. Print masks for each pass in a multipass printer can be generated such that adjacent dot locations in the halftone pattern associated with a pixel are not printed to in the same pass, or sometimes in subsequent passes, to allow time for a deposited ink drop to dry before an adjacent ink drop is deposited.

Based upon the desired appearance of each pixel, the ink drops to be deposited in each position of the halftone pattern for the pixel are determined. For a light color pixel it may be sufficient to deposit a single drop of ink in the halftone pattern associated with that pixel. While a darker color pixel may require further dots to be deposited on the same pixel. Dots are then deposited on the determined positions based on a multilayer print mask, where each layer specifies the locations in the halftone pattern that may be printed to in a particular pass.

To achieve this, every input pixel of the desired image is mapped to a location on the print medium (which may be a cluster of pixels on the print medium) and assigned a level based on the desired color saturation of the pixel. For example, a pixel may be assigned a level value of 0, 1, 2, or 3. Each level value corresponds to a number of ink drops to be deposited for that pixel (e.g. for a level of 0 no drops are deposited, level 1 results in one drop, level 2 in three drops, and level 3 in six drops, although other mappings can be used).For an example in which up to six ink drops may be deposited for a single pixel location on the print medium, a minimum of six passes of the printhead across the medium will be required. The print mask defines in which six passes of the printhead each of the six drops may be laid down. Thus, in this example, the print mask has at least six layers, i.e. a layer for each pass of the printhead, with a first layer of the mask defining every position at which a first ink drop may be laid down, the second layer defining the positions at which a second drop may be laid down, etc. In the case that the same mask layers are reused for one drop of level 2 pixels as are used for the only drop of level 1 pixels, and for three drops of level 3 pixels as are used for the three drops of level 2 pixels, then a total of six mask layers will be sufficient. Such a mask is called a progressive mask.

In some cases, the mask may be defined such that layers are not reused (a non-progressive mask), in such a case one layer will be defined for level one pixels, three further layers are defined for level 2 pixels, and six further layers are defined for level 3 pixels.

While the above discussion includes references to first and second ink drops being deposited for a pixel, it is noted that in operation of a inkjet printer drops may be laid down in any order.

Commonly, a print head comprises an array of nozzles for printing a swath multiple pixels deep in each pass. One technique that has been used to help reduce the visibility of banding in the final printed image is to deposit a proportion of the desired ink drops for the final image in each pass, advance the print medium a fraction of the swath depth through the printer and then print a further swath that overlaps with one or more previous swathes.

For example, if we consider a case in which a single level of pixels are to be printed to the print medium with four passes of a printhead, at every pixel location on the print medium, exactly one ink drop needs to be laid down. In each pass, approximately one quarter of the pixel locations receive an ink drop, after which the print medium is advanced through the printer and the next pass adds ink drops to another quarter of the pixel locations as disjoint positions to those laid down in the previous pass. After this process is repeated for four passes of the printhead, the print medium will have advanced by one swath height through the printer and the quarter density overlaid four times by the four passes will result in the desired ink density being achieved.

Such an arrangement allows ink drops laid down in any one pass to be located further apart from each other, avoiding coalescence caused by drops touching and merging before they have a chance to dry. Furthermore, the nozzles are only required to fire at approximately a quarter of the rate as if the ink density was to be deposited in a single pass. This lower average firing frequency provides more time for the nozzles to recover between activations. Finally, if the advance distance is not exactly correct, for example if it is too large, where the bottom of the swath meets the top of the swath four passes layer, instead of having a narrow strip in which no ink has been laid down with regions of full ink density above and below, the misalignment will result in a narrow strip having three quarters of the desired ink density.

While the above multipass example results in less visible banding artifacts than in a printer that deposits the full ink density in one pass, a jump from three quarters density is still visible in the final image. Furthermore, such bands will appear in the final printed image with four times the frequency.

In order to further reduce banding artifacts, instead of laying down a uniform amount of ink over the whole height of the swath, the quantity of ink laid down could be made to linearly increase from zero at the top of the swath to a third of the desired density at a quarter of the depth of the swath, then remain constantly a third of the desired density until reaching three quarters of depth of the swath, and then linearly decrease to zero, such that the nozzle profile, or mask profile, has the shape of an isosceles trapezoid.

As for the example above, after each pass the print medium is advanced through the printer by a quarter of the height of the swath after each pass. However, in this case, when you sum the density of a swath with a swath printed three passes later, the resultant profile is a flat one third density. This is because the ramp up and ramp down of the two swathes sum exactly to a third of the desired density, equal to the density deposited across the center of the nozzle profile.

In this case, a slight over-advance of the print medium results in these two opposite ramps summing to something slightly lower than a third density, but only very slightly. The error becomes spread across the size of the ramp, resulting in less visible artifacts being present in the final image.

Using a ramped profile such as that described above requires that the densest zone of ink drops laid down in a single pass is must denser than for the uniform profile example, i.e. ⅓ density as opposed to ¼. This reduces the distances between drops laid down in a single pass, and increases the required firing frequency. However, in many printing systems, it may not be possible to increase the firing frequency of the nozzles, or to allow the distances between drops laid down on a single pass to be reduced without drops coalescing.

Thus, in order to use a ramp nozzle profile, it is necessary to either reduce the speed at which the printhead is scanned across the print media, resulting in a reduced firing frequency, or to increase the number of passes of the printhead, which both reduces the firing frequency and increases the distance between drops laid down in a single pass as the drops are now spread over more passes. However, both of these options result in reduced throughput of the printer.

Furthermore, while the use of ramp masks are generally effective in hiding advance banding artifacts, it has been observed that a different kind of banding artifact can be introduced, especially on low pass print modes, that consists of regular interchanging darker and lighter zones within the print output. This banding is known as Dark-Light Zone banding.

Different printing artifacts may be associated with different levels of color in the final image. For example it has been found that advance banding in areas of an image with relatively low levels of ink, i.e. light color regions, is less visually obtrusive than the same level of advance banding in darker color regions of an image. Similarly, Dark-Light Zone banding has been found to be more visible in light color regions in some situations.

In some cases, it is desired to maintain high throughput of the printer, but the firing frequency and or distance between deposited ink drops are already at or near the limit when using a uniform mask. In such cases, as using a ramped mask would increase the firing frequency of the nozzles or reduce the distance between drops deposited in a single pass, ramped nozzle profiles cannot be used. This results in a trade-off between throughput of the printer and the presence of advance banding in the final image.

According to some embodiments of the present invention, it is possible to apply a nozzle profile that provides some of the benefits of a ramp profile without exceeding the maximum firing frequency and minimum average drop distance.

According to some embodiments of the present invention, different nozzle profiles can be applied to different layers of a mask. Thus, rather than being limited to using a ramp nozzle profile, or a uniform nozzle profile, for each layer of the mask, some layers may use a ramp profile while other layers may use a uniform, or some other, profile.

This can result in some drops of ink being deposited during printing of a swath according to a uniform nozzle profile, while other drops of ink are deposited using a ramp profile.

In some example embodiments, halftone level values 0, 1, 2, and 3 may correspond to 0, 1, 2, or 3 drops of ink to be laid down for that pixel, and a progressive mask is used. For a pixel in the printed image, three passes are required in order to allow three drops of ink to be deposited for a level 3 pixel. For example, a first drop may be laid down in a first pass, a second drop in a second pass, etc. In reality, it will be understood that the pixels may actually be deposited in any order.

For a region of pixels having a level value 1, only the first drops are laid down at those pixel positions, and a uniform nozzle profile, associated with the first mask layer, is employed to deposit a proportion of the desired ink density for the pixels. Subsequent passes for these pixels would also employ a uniform nozzle profile. However, for level 2 or 3 pixels the second and or third drops of ink to be deposited to each pixel location will employ a ramped nozzle profile.

This results in the nozzles at the extreme edges of the swath to be used a certain non-zero number of times for the first drops being deposited according to the uniform profile, in contrast to a ramp profile in which edge nozzles have a very low or zero probability of use. However, the profile still has a ramp portion towards the edges of the swath due to the ramp profiles used for the second and third drops.

Figure 2:
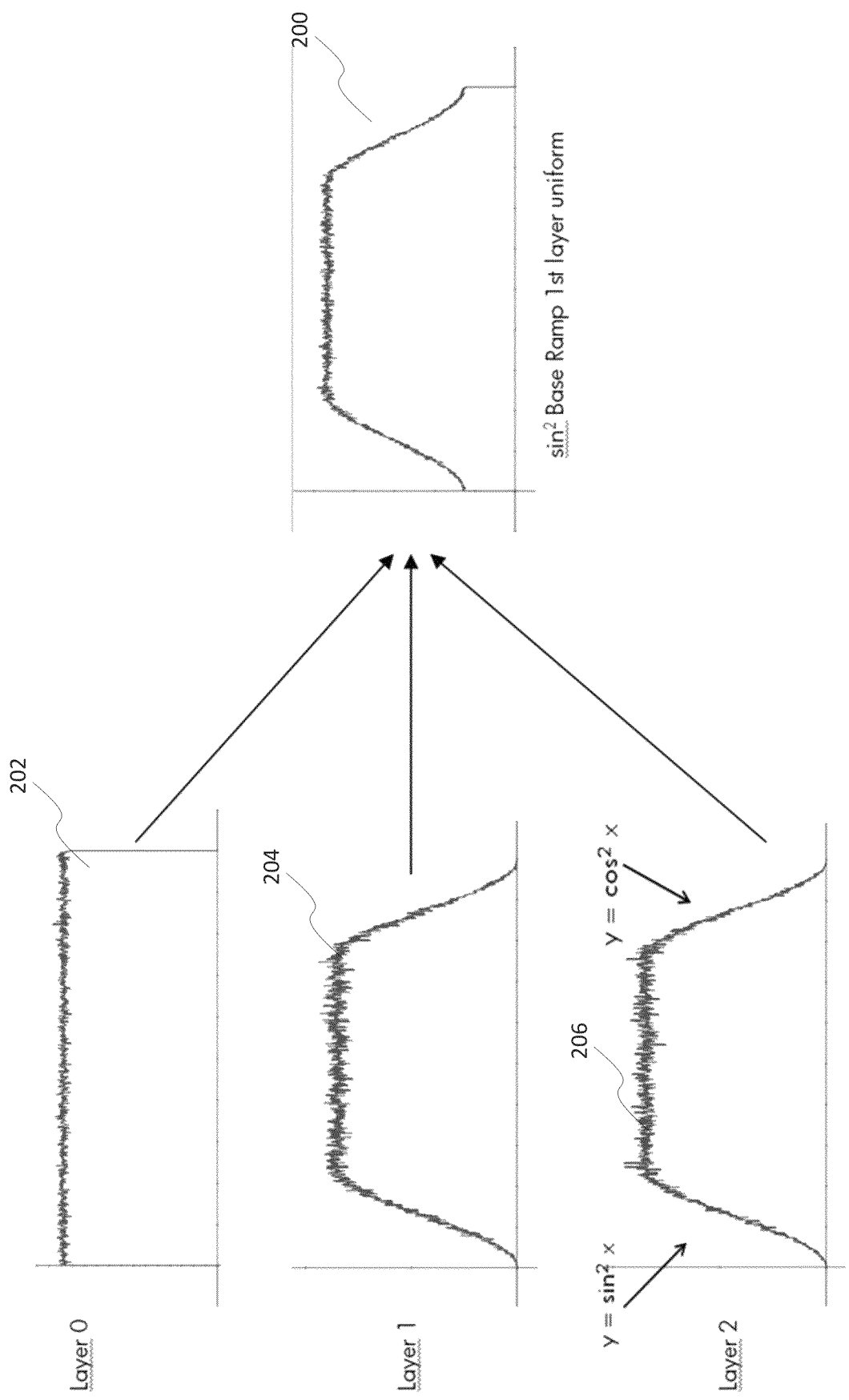
FIG. 2 illustrates a block diagram of a printing system according to one example.

Thus, the actual nozzle profile takes the form of a based ramp in with an underlying base due to those ink drops deposited using a uniform profile with a ramp portion superimposed on top. FIG. 2 illustrates a base ramp profile 200 generated from an arrangement similar to that discussed above with a first layer, layer 0, having a uniform profile 202 and further layers, layer 1 and layer 2, having ramp profiles 204, 206.

FIG. 1 illustrates a print apparatus that can be used to implement some embodiments of the invention. The print apparatus 100 comprises a controller 102 coupled to a print head assembly 104 and to a print media feed 112. The print head assembly 104 includes a plurality of nozzles 106 which can be individually controlled to eject a drop of ink upon command. The nozzles are arranged in an array to allow a swath a number of pixels high to be printed to in each pass of the print head 104 across the print medium 108. Print media feed 112 operates to advance a print medium 108 through the print apparatus 100.

In operation, controller 102 receives an image to be printed and generates a halftone image that approximates the received image and can be printed using the ink colors available from the ink supply 110. For example, the received image may be a continuous tone "contone" image having 8 bits per pixel for each color channel which is converted into a halftone image having 2 bits per pixel per color channel. The 2 bits per pixel per color channel of the halftone image provides four levels for each color for each pixel. The value assigned to each color associated with a pixel may correspond with a number of ink drops to be deposited in the halftone pattern for that pixel. For example, if the pixel color value is zero, no drops of ink of that color should be deposited in the halftone pattern for that pixel. A value of one may be interpreted as one drop of ink being deposited for that pixel, two may correspond to three drops of ink and three may result in six drops of ink of that color being deposited for the pixel.

The levels described above are purely examples and it will be recognized that different levels may correspond to different numbers of ink drops as appropriate for a particular printer apparatus.

A multi-layer print mask is used to control where in the halftone pattern associated with a pixel each drop of ink is to be deposited based on the generated halftone image. If it is determined a single drop of ink is required, this may be deposited in a single pass using a first layer (layer 0) of the multi-layer mask. Three drops of ink may be applied using layers 0, 1 and 2 of the mask to apply one drop of ink per color per pass to a pixel, and so on for greater numbers as required.

Under control of the controller 102, the print head 104 is scanned across the print medium 108 and individual nozzles of the plurality of nozzles 106 are commanded to eject drops of ink at specific positions, according to the print mask. Each pixel may be formed from drops of ink deposited over a number of passes, in accordance with the multilayer print mask. Once a swath has been printed, the print media feed 112 is commanded to advance the print medium 108 through the printing device 100 by a portion of the swath height. By repeating this procedure, a desired image may be reproduced on the print medium 108.

The print apparatus 100 uses a Base-Ramp Mask 114 to control the positions at which a drop of ink may be placed in each pass of the print head 104. In the Base-Ramp Mask 114, different layers of the mask have different nozzle profiles as illustrated in FIG. 2.

In one example, when used with the print apparatus 100 of FIG. 1, if a single drop of ink of a certain color is to be applied to a pixel this is achieved using layer 0, and is therefore applied according to a mask layer with a uniform nozzle profile 202. However, if three drops of ink are to be applied, layers 0, 1 and 2 will be used in three separate passes. In this case, the first drop of ink will be applied according to a uniform nozzle profile 202, while the second and third drops of ink will be deposited according to ramp nozzle profiles of layers 1, 204, and 2, 206, as shown in FIG. 2.

As advance banding is generally less severe in lighter colors, any advance banding introduced through the use of a uniform mask for layer 0 can be effectively hidden using interleave routines. However, as advance banding is more visible in mid-tones and saturated colors, ramp nozzle profiles can be applied in layers 1 and 2 to reduce these artifacts when darker more saturated color pixels are printed. Ramp profiles associated with layers 1 and 2 are chosen to be compatible with an interleave routine used in conjunction with layer 0.

According to some embodiments, the ramp nozzle profiles applied to layers 1 and 2 have a combination of $\sin^2$ and $\cos^2$ ramp nozzle profiles. This allows the ramp profiles to be easily combined with the interleaved uniform profile of layer 0 due to the linear saturation at the end of each of layers 1 and 2.

Figure 3:
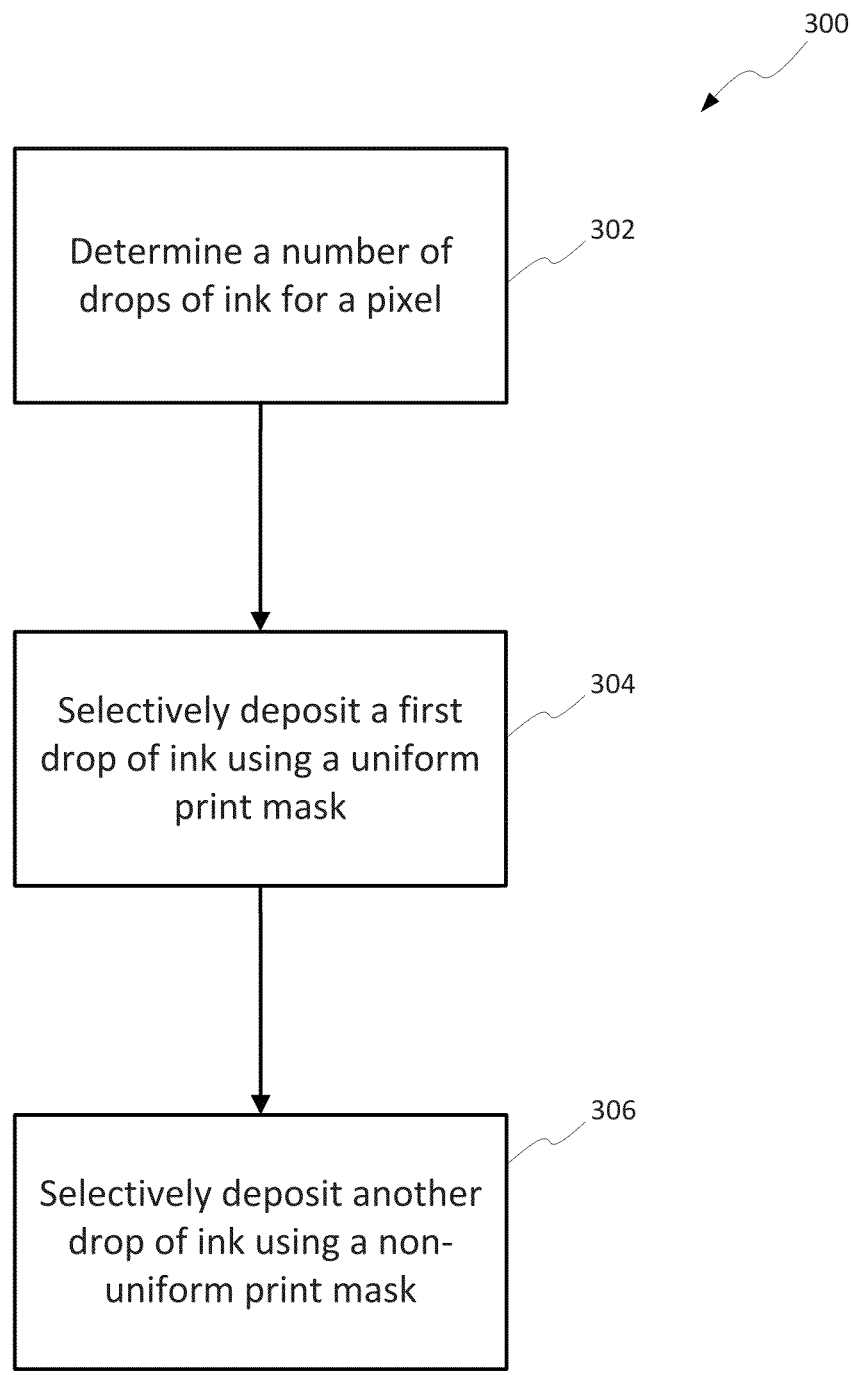
FIG. 3 illustrates a method of depositing drops of ink according to a multi-layer mask having different print mask functions according to one example.

FIG. 3 illustrates a method 300 according to some embodiments. In a first stage 302, a number of drops of ink to be deposited for a pixel of the final image is determined. Depending upon the number of drops of ink to be deposited, in a next stage 304, a first drop of ink is deposited for the pixel using a first layer of a multi-layer Base-Ramp mask 114. The first layer of the Base-Ramp mask having a substantially uniform print mask function 202. A further drop of ink is deposited at stage 306 under control of a further layer of the multi-layer Base-Ramp mask 114, the further layer having a non-uniform print mask function, for example a ramp function 204.

Thus, the print apparatus 100 is able to use different masking nozzle profiles for different levels of the same mask. This allows the nozzle profiles for each layer to be chosen according to the printing artifacts that are most obtrusive in the final image associated with a particular mask layer, for example applying ramp nozzle profiles when printing darker pixels (higher layer numbers) to reduce the appearance of advance banding that is most visible at higher ink drop densities.

The use of a Base-Ramp mask may lower the overall Firing Frequency compared to an all ramps print mode. The use of ramp profiles increases the fire frequency of the central nozzles of the array of nozzles on the print head 104. In a low-pass print mode, the firing frequency is already at its upper limit in order to provide the greatest possible ink density in a low number of passes. Thus, using ramp nozzle profiles in a low-pass print mode generally leads to a reduction in achievable ink density.

The exact firing frequency when applying a Base-Ramp mask 114 depends on the exact combination of nozzle profiles assigned to each layer. However, the use of uniform nozzle profiles for one or more layers will result in a reduced overall firing frequency as compared with an all ramps print mode, thereby increasing the achievable ink density that can be applied to the print medium 108 for the nozzle array 106 in a low-pass print mode.

In some embodiments higher numbers of layers may be used according to the number of passes required to deposit the desired number of ink drops to each pixel. The division of layers between uniform and ramp profiles may be chosen such that the largest number of ramp profiles are used without the maximum firing frequency being exceeded or the average distance between drops deposited on a single pass being reduced below an allowable minimum value. This would allow the printer to maintain throughput while also providing some of the benefits of ramp nozzle profiles.

According to further embodiments, rather than the base-ramp mask profile being formed from a combination of a uniform mask and a ramp mask, each layer of the mask may be generated having a base-ramp profile. Such an arrangement may allow more accurate fine tuning of the nozzle profile parameters to maximize the ramp portion of the mask within the firing frequency and drop separation constraints.

Furthermore, although a Ramp can be very effective in hiding advance banding it has been observed that a different kind of banding artefact can be introduced, in particular on low pass Print Modes. One banding artifact that has been observed consists of regular interchanging darker and lighter zones within the print. As masks using uniform nozzle profiles have been found to be less susceptible to this type of banding, if uniform nozzle profiles are chosen for one or more layers of the mask, it has been seen that the overall visibility of printing artifacts in the final image can be reduced.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The readers attention is directed to all papers and documents which are filed concurrently with or previous to this specification in connection with this application and which are open to public inspection with this specification, and the contents of all such papers and documents are incorporated herein by reference.

The invention claimed is:

1. A method for use in printing a swath in a multipass printing device, the method comprising:
    for one layer of a multi-layer print mask, selectively depositing a drop of ink associated with a pixel to be printed on a print media based on a substantially uniform print mask function;
    for another layer of the multi-layer print mask, selectively depositing another drop of ink associated with the pixel on the print media based on a non-uniform print mask function; and
    for one or more additional layers of the multi-layer print mask, selectively depositing one or more additional drops of ink associated with the pixel on the print media based on one or more additional non-uniform print mask functions.

2. The method of claim 1, wherein said non-uniform print mask function comprises a ramp print mask function.

3. The method of claim 1, wherein the one layer of the multi-layer print mask comprises a first, layer 0 of the multi-layer print mask, and the another layer of the multi-layer print mask comprises a second, layer 1 of the multi-layer print mask.

4. The method of claim 2, wherein the ramp print mask function comprises a combination of $\sin^2$ and $\cos^2$ ramp functions.

5. The method of claim 1, further comprising interleaving drops of ink deposited for the swath using the substantially uniform print mask function with drops of ink deposited for a subsequent swath using the substantially uniform print mask function.

6. The method of claim 1, wherein the non-uniform print mask function comprises a ramp print mask function and the one or more additional non-uniform print mask functions comprise one or more additional ramp print mask functions different to the ramp print mask function.

7. An apparatus for printing a swath using a plurality of passes over a print medium, the apparatus comprising:
    a print head comprising an array of nozzles;
    a controller coupled to the print head and configured to cause the array of nozzles to selectively deposit a drop of ink for a single pixel location of an image to be printed on a print medium based on a substantially uniform print mask function during one pass of the print head for printing the swath, to selectively deposit another drop of ink for the single pixel location based on a non-uniform print mask function during another pass of the print head for printing the swath, and to selectively deposit one or more additional drops of ink for the single pixel location based on one or more additional non-uniform print mask functions during one or more additional passes of the print head for printing the swath.

8. The apparatus of claim 7, wherein the non-uniform print mask function comprises a ramp print mask function.

9. The apparatus of claim 7, wherein the controller is further configured to cause the array of nozzles to selectively deposit drops of ink using a multi-layer print mask, wherein one layer of the multi-layer print mask comprises the substantially uniform print mask function, and another layer of the multi-layer print mask comprises the non-uniform print mask function.

10. The apparatus of claim 8 wherein the ramp print mask function comprises a combination of $\sin^2$ and $\cos^2$ ramp functions.

11. The apparatus of claim 7, wherein the controller is further configured to cause the array of nozzles to interleave drops of ink deposited for the swath using the substantially uniform print mask function with drops of ink deposited for a subsequent swath using the substantially uniform print mask function.

12. The apparatus of claim 7, wherein the non-uniform print mask function comprises a ramp print mask function and the one or more additional non-uniform print mask functions comprise one or more additional ramp print mask functions different to the ramp print mask function.

13. A non-transitory computer program code comprising instructions that, when executed, cause an array of nozzles carried on a print head to:
    for one layer of a multi-layer print mask, selectively deposit a drop of ink associated with a pixel to be printed on a print media based on a substantially uniform print mask function during one pass of the print head in printing a swath;
    for another layer of the multi-layer print mask, selectively deposit another drop of ink associated with the pixel on the print media based on a non-uniform print mask function during another pass of the print head in printing the swath; and
    for one or more additional layers of the multi-layer print mask, selectively deposit one or more additional drops of ink associated with the pixel on the print media based on one or more additional non-uniform print mask functions during one or more additional passes of the print head in printing the swath.

14. The non-transitory computer program code of claim 13, wherein said non-uniform print mask function comprises a ramp print mask function.

15. The non-transitory computer program code of claim 13, wherein the one layer of the multi-layer print mask comprises a first, layer 0 of the multi-layer print mask, and the another layer of the multi-layer print mask comprises a second, layer 1 of the multi-layer print mask.

16. The non-transitory computer program code of claim 14, wherein the ramp print mask function comprises a combination of $\sin^2$ and $\cos^2$ ramp functions.

17. The non-transitory computer program code of claim 13 further configured when executed on a processor to interleave drops of ink deposited for the swath using the substantially uniform print mask function with drops of ink deposited for a subsequent swath using the substantially uniform print mask function.

* * * * *

UNITED STATES PATENT AND TRADEMARK OFFICE
CERTIFICATE OF CORRECTION

| | | |
|---|---|---|
| PATENT NO. | : 8,905,521 B2 | Page 1 of 1 |
| APPLICATION NO. | : 13/754198 | |
| DATED | : December 9, 2014 | |
| INVENTOR(S) | : Andreas Mueller et al. | |

It is certified that error appears in the above-identified patent and that said Letters Patent is hereby corrected as shown below:

On the title page item (72), Inventors, in column 1, line 5, delete "Saint Quirze del Valles" and insert -- Sant Quirze del Valles --, therefor.

Signed and Sealed this
Twenty-sixth Day of May, 2015

Michelle K. Lee
*Director of the United States Patent and Trademark Office*